United States Patent Office 3,131,077
Patented Apr. 28, 1964

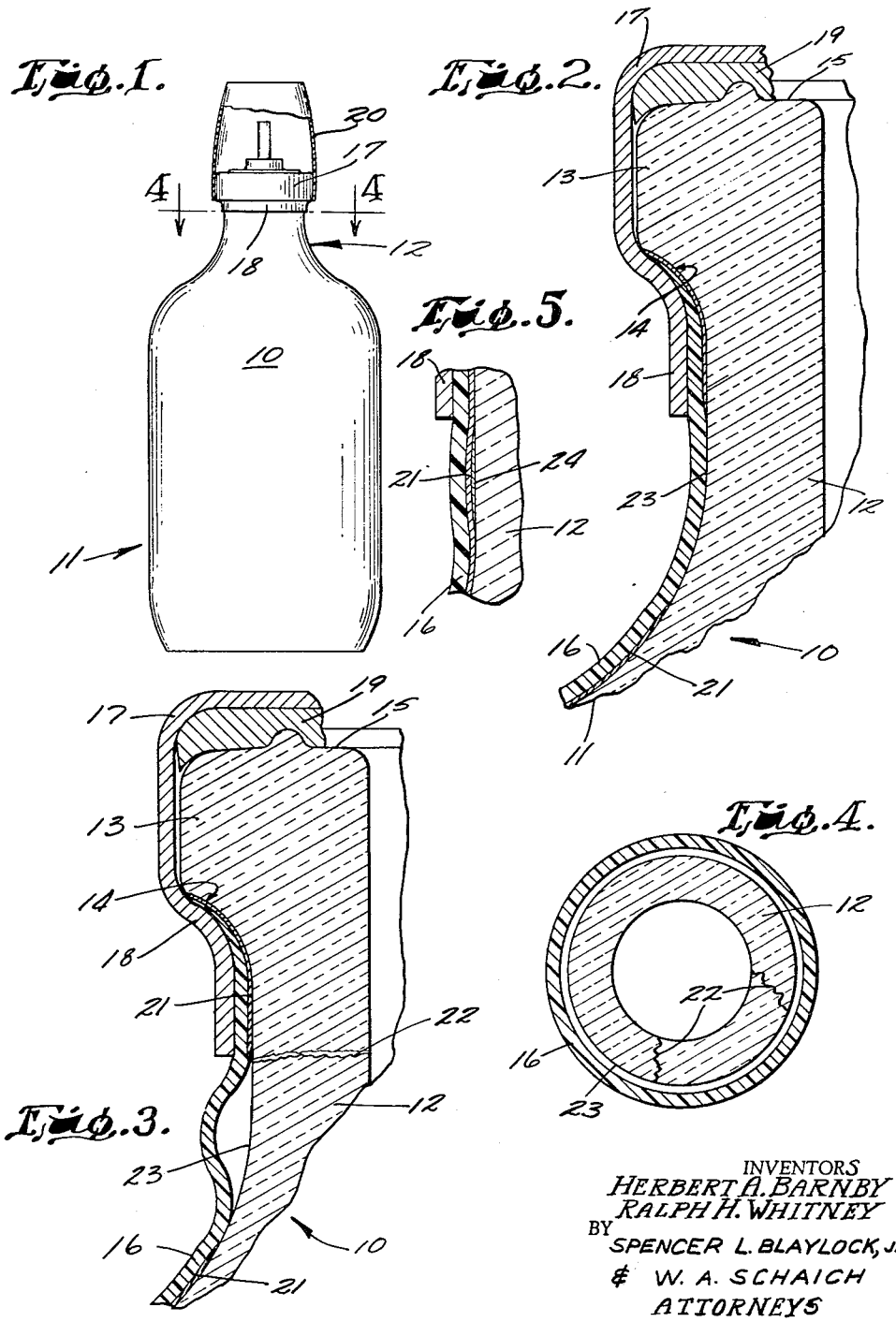

3,131,077
METHOD OF PRODUCING AEROSOL-
TYPE PACKAGE
Herbert A. Barnby and Ralph H. Whitney, Toledo, Ohio, assignors to Owens-Illinois Glass Company, a corporation of Ohio
Original application Aug. 24, 1959, Ser. No. 835,545, now Patent No. 3,014,607, dated Dec. 26, 1961. Divided and this application May 22, 1961, Ser. No. 111,631
4 Claims. (Cl. 117—5.5)

This application is a division of application Serial No. 835,545, filed August 24, 1959, now Patent No 3,014,607.

Our invention relates to aerosol-type packages or containers and methods of producing them and more particularly to the provision of a substantially overall plastic or thermoplastic protective coating which can and will expand in a preselected localized area and thus serve as a "tell-tale," in the event the container has been fractured in that area and leaks pressurized contents at the fracture point.

In aerosol-type or "pressure" containers formed of glass, or the like material, they may, but do not necessarily, include a reduced neck portion and a head surmounting such neck. To this head is attached a dispensing-type closure cap or fitment, such being hermetically sealed in place by spinning or otherwise contracting an attaching skirt beneath the head or over some other protuberance, into firm contact with the adjacent surface of the container. The container may be filled either prior to or following such closing.

Because such spinning or other procedure resorted to in contracting the attaching skirt into effective tight holding relationship with the glass subjects the latter to considerable pressure or stress and in some instances cracks or fractures the glass so that the container will leak, in normal use, it is necessary to provide reliable means for detecting or indicating the presence of any such "leakers," or "potential leakers," prior to placing the packages in the hands of the consuming public.

An object of our invention is to provide novel means for so applying an elastic protective coating of plastic, resinous or thermoplastic material, to the exterior surface of an aerosol-type bottle, that readily observable expansion of the coating in a selected localized isolated zone will occur, should there be a fracture in that zone of such severity as to permit leakage of the pressurized contents.

Another important object of our invention is the provision of simple and effective means which will prevent complete separation of broken glass sections and/or dispensing fitments from the package, under internal pressure.

Other objects will be in part apparent and in part pointed out hereinafter.

In the drawings:

FIG. 1 is a side elevational view of an aerosol-type package or container incorporating our invention.

FIG. 2 is a fragmentary detail sectional view showing the protective coating bonded to the glass container except in a restricted annular neck area.

FIG. 3 is a view similar to FIG. 2 but showing the coating expanded under the influence of pressurized content which has escaped from the container through a neck fracture.

FIG. 4 is a sectional view taken along the line 4—4 of FIG. 1 but shows the coating expanded in the neck zone to indicate leakage of the pressurized content.

FIG. 5 is a detail fragmentary sectional view illustrating means for preventing adhesion of the thermoplastic coating and bonding agent to the bottle in a restricted area.

On invention, in the illustrated embodiment, is incorporated in a pressure container of the well-known aerosol-type. Although other specific forms of containers may be utilized, we, for present purposes, have shown the invention applied to a glass bottle or the like container 10 including a body portion 11 formed with a diametrically reduced upstanding neck 12 which is surmounted by an enlarged head 13 or rim portion. This head provides a downwardly outwardly facing abutment or shoulder 14 and a relatively flat top sealing surface 15 of annular form. A protective plastic or a thermoplastic coating 16 formed for example of plastisol, or some vinyl resin dispersion or suspension material incases substantially the entire bottle, such coating being securely bonded to the exterior surface of the container. A dispensing-type closure, or fitment 17, is telescoped over the head 13 and has an attaching skirt 18 spun over the abutment or shoulder 14 and into firm holding engagement with the upper marginal portion of the protective coating 16. A sealing element 19 is interposed between the closure and the top sealing surface 15 of the head 13. A cover 20 is provided for the dispensing fitment.

It is important that these pressure containers be coated with a protective cushion-like or elastic, plastic or thermoplastic film, but it also is equally important that such film or coating should not preclude ready detection of potentially dangerous fractures in the containers. As stated heretofore, these fractures, if they occur at all, almost invariably are in that area in which pressure of the tool is applied to the glass as it affixes the closure or fitment to the container, accordingly, we have provided means whereby, in the event there is leakage of pressurized contents through a fracture, the coating will quickly expand or bulge in a localized zone and afford visible evidence of the abnormal conditions.

The protective coating is secured to the glass container through a procedure involving first applying a prime coat or bonding agent 21 in the form of a thin film, to the glass surface in those areas in which adhesion of the protective coating to the glass is desired. The prime coat, or bonding agent 21, may well as broadly defined as an amino alkylalkoxy silane, and it has been found that excellent results are also obtainable when the silane has at least one alkyl group and at least one ethoxy group directly linked to the silicon atom. Further, however, a primer composition containing an epoxy resin and an alkyl methacrylate polymer may be applied as a film to the silane referred to above, but preferably it is incorporated as a component of a single mixture including the latter, thus avoiding the need for a second coating step, insofar as application of the bonding agent per se is concerned.

We provide means for neutralizing the effectiveness of the bonding agent in the neck area or a selected exterior surface portion of the container so that the protective coating 16 may expand or bulge in this area, should the bottle be seriously defective in the neck zone. Such expansion or bulging occurs only if the fractures 22 (FIG. 4) are of such character as to open and allow leakage of pressurized content of the package, when subjected, for example, to a hot water bath. This hot water bath involves immersing filled sealed packages in a bath of water heated to about 130° F. to 150° F. for a period of about 3 to 4 minutes. Such treatment raises the temperature of the contents substantially and thus increases the internal pressure with resultant leakage of such contents in the event the structural defect, or fracture, is of really serious nature. Expansion of the coating in an annular zone about the fracture provides clearly visible evidence of the defect.

Obviously, provision must be made whereby the protective coating may expand freely relative to and independently of the neck when the described leakage occurs. To this end, we may either omit the bonding agent 21 in a selected isolated area 23 (FIGS. 2–4) encircling the neck 12, or as in FIG. 5, coat the glass surface in this same area or perhaps some other area, or zone, as determined by the specific form of the container, with a neutralizing material 24 which will preclude any effective adhesion of the prime coating and therefore the protective coating to the glass. Such neutralizing material may well be glycerin, liquid silicone, water containing a wetting agent, the latter for example being one of the well-known detergents such as that sold under the trademark "Joy" or perhaps a dilute water suspension of polyethylene, as examples.

Modifications may be resorted to within the spirit and scope of the appended claims.

We claim:

1. In the method of affixing an elastic protective plastic casing to the exterior surface of a frangible aerosol-type container and providing means permitting localized outward expansion of the casing in a neck zone of potential fracture incident to leakage of pressurized contents at the fracture point, the steps consisting in applying to the exterior surface in said zone a material for neutralizing the effectiveness of a bonding agent which is to be applied substantially as an overall coating for the container, applying a film of a bonding agent to substantially the entire exterior surface of the container and over the neutralizing material and applying a protective film of elastic resinous material to the entire surface of said bonding agent.

2. The method according to claim 1 wherein the neutralizing material is a dilute suspension of polyethylene.

3. The method according to claim 1 wherein the neutralizing material is glycerin.

4. The method according to claim 1 wherein the neutralizing material is a liquid silicone.

References Cited in the file of this patent

UNITED STATES PATENTS

| | | |
|---|---|---|
| 286,823 | Hopkins | Oct. 16, 1883 |
| 1,304,749 | Divine | May 27, 1919 |
| 2,917,197 | Glover et al. | Dec. 15, 1959 |
| 2,957,779 | Bolton | Oct. 25, 1960 |
| 3,014,607 | Barnby et al. | Dec. 26, 1961 |
| 3,018,106 | Satchell et al. | Jan. 23, 1962 |